June 4, 1929.  W. F. BULL  1,715,405
MEASURING DEVICE
Filed May 21, 1926
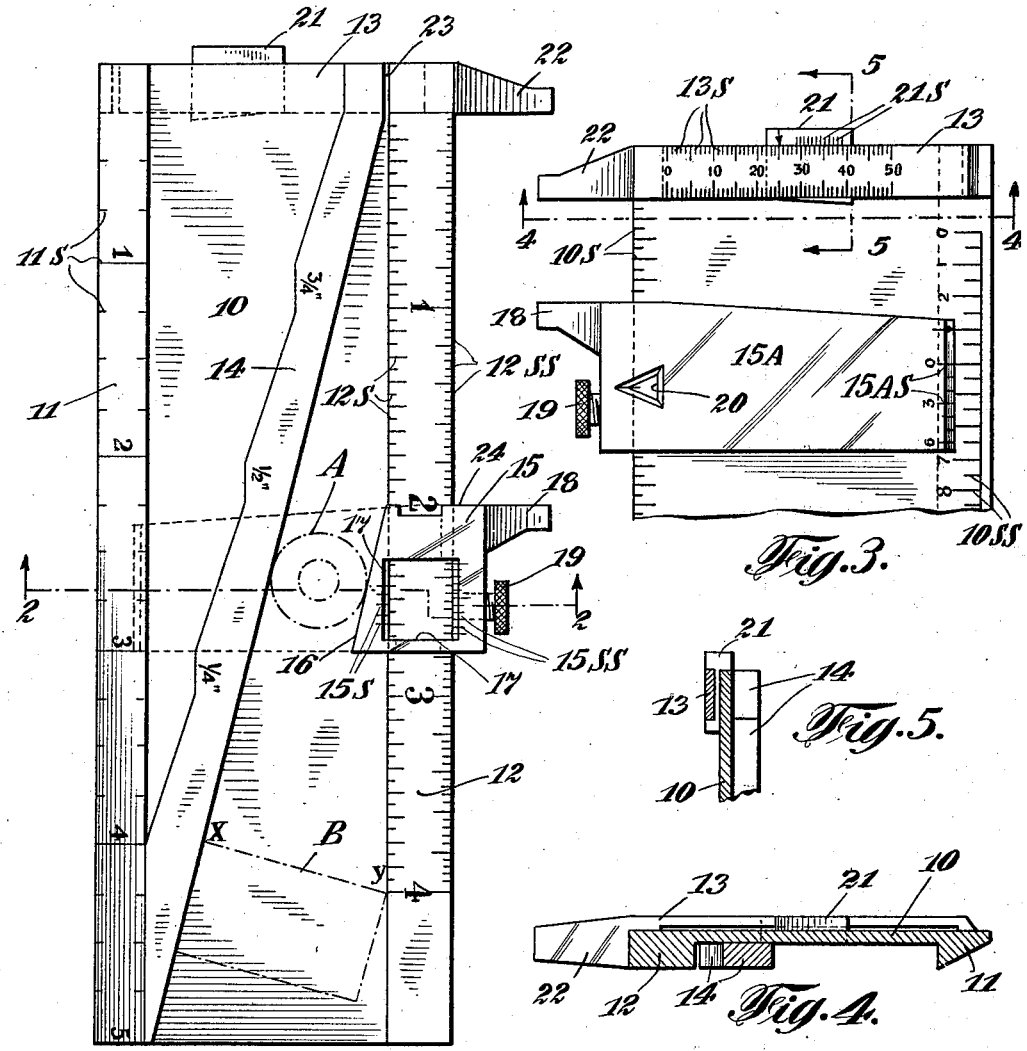
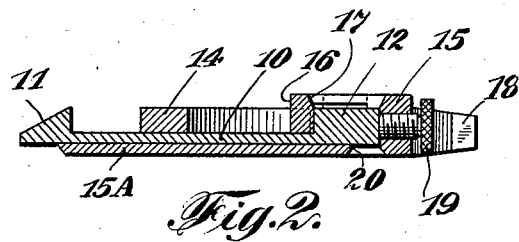
INVENTOR
William Francis Bull
BY
his ATTORNEY Patented June 4, 1929.

1,715,405

UNITED STATES PATENT OFFICE.

WILLIAM FRANCIS BULL, OF NEW YORK, N. Y.

MEASURING DEVICE.

Application filed May 21, 1926. Serial No. 110,634.

My invention relates to measuring devices and refers particularly to devices suitable for the dimensional measurement of objects of various sizes and shapes.

Among the objects of my invention, is a device capable of making fine and accurate measurements of objects, in which the operation is quickly obtained, the employment of fine adjusting screws avoided and which has uses to which the ordinary micrometer and vernier calipers cannot be applied.

In the accompanying drawings illustrating one form of the device of my invention, similar parts are designated by similar numerals.

Figure 1 is a top view of one form of the device of my invention.

Figure 2 is a cross-section through the line 2—2 of Figure 1.

Figure 3 is a broken bottom view of a portion of Figure 1.

Figure 4 is a cross-section through the line 4—4 of Figure 3.

Figure 5 is a cross-section through the line 5—5 of Figure 3.

The particular form of the device of my invention shown in the accompanying drawings comprises a parallelogram-shaped device having the base 10, the triangularly shaped straight-edge side 11, the straight-edge side 12 and the straight-edge end 13. A diagonal straight-edge member 14 is positioned angularly to the straight-edge 12, one side of the member 14 being straight and the other side being stepped.

The space between the straight-edge 11 and the stepped side of the straight-edge 14 is used for measuring objects placed therein in the same manner as object B shown in Figure 1. The measurements in this space are limited to the number of steps provided, the steps being marked in sizes as indicated in Figure 1.

It will be noted that the straight-edges 12 and 14, the slide 15 and the jaws 18 and 22 are so positioned that two objects may be measured or compared as to their relative sizes, at the same time by the graduations on the straight-edge 12. This is important as it is frequently desirable to compare the element of a device with another element of that device in order to be assured that they will operate properly and in conjunction with each other.

Slidable upon the member 12 is a slide 15 having its angularly positioned edge 16 between the members 12 and 14 and parallel to the edge of the member 14. The slide 15 has an opening 17 in its upper face and is extended into the caliper jaw 18. A set-screw 19 passing through a threaded opening in the side of the slide 15 allows of its fixed positioning upon the member 12. The lower plate 15A of the slide 15 has a triangular opening 20.

Slidable upon the member 13 is a slide 21 extending beyond the sides of the member 13.

The member 13 has the extended caliper jaw 22.

The upper face of the member 11 carries the scale graduations 11S. The upper face of the member 12 carries the scale graduations 12S and 12SS. The slide member 15 carries the vernier scales 15S and 15SS.

The lower face of the base 10 carries the scales 10S and 10SS.

The lower face of the member 13 carries the scale 13S, the slide 21 carries the vernier scale 21S and the member 15A carries the vernier scale 15AS.

An opening 23 between the members 12 and 14 allows of the removal of dust accumulating upon the base 10.

The following methods of operation indicate some of the uses of my measuring device.

To determine the diameter of a round object, the object A is positioned upon the base 10 between the member 14 and the slide 15 and the object and slide moved until contact is caused between the object, the member 14 and the slide 15, and the diameter reading taken at the edge 24 of the slide 15 upon either scale 12S or 12SS plus such vernier scale 15S or 15SS as may be shown. When the shape of the article allows, as shown at B in Figure 1, the measurement may be taken without the use of the slide 15.

The distance from X to Y in Figure 1 is one inch. The scale 12S is graduated to 64 parts, and hence, object A scaling at 32 is one-half inch in diameter and object B, scaling at 64 is one inch in measurement. The vernier 15S subdivides the graduations of scale 12S into four parts.

The scale 12SS has one hundred graduations, each 100th part being subdivided by vernier 15SS on slide 15 into ten parts, thus giving a vernier indication of 1000ths of an inch.

When measuring objects between the caliper jaws 18 and 22, however, the scale 12S is read in inches, which are graduated in sixteenths of an inch, with vernier scale 15S indicating sixty-fourths of an inch, and 12SS graduated in twenty-fifths of an inch with vernier 15SS indicating 250ths of an inch.

The maximum and minimum limits of measurement within a tapered measuring space, instead of being fixed at certain points, as shown in Figure 1, may be variable at will by making member 14 or 12 adjustable. The fixed and adjustable methods may be combined in the one instrument, this being the type of construction shown in drawings and described herein. The adjustable method is carried out on the reverse side of the device as shown in Figure 3. The fixed caliper jaw extension 22 is continued across the width of the flat base 10, and has scales marked thereon and a slide 21 with vernier which in use corresponds to member 12 and slide 15 in Figure 1. The reverse side of the slide 15 to that already described is similarly extended to form a member 15A equivalent to member 14 in Figure 1. A scale 10S is shown, marked in twentieths of an inch. To use the adjustable method the slide 15 is set and locked by means of the set screw 19, or an equivalent locking device, at any one of the graduations on scale 10S. An opening 20 on extension 15A shows one graduation mark as an indicator to assist in setting the slide exactly at the desired point. This setting of slide 15 determines the limits of measurement. As shown in Figure 3, the maximum limit is one-twentieth of an inch greater than the minimum. This twentieth of an inch difference is divided by the scale 13S into fifty parts, thus slide 21 indicates measurements in thousandths of an inch. The vernier on slide 21 subdivides each graduation into ten parts, giving a vernier indication in 10,000ths of an inch. In Figure 3, the slide 15 is shown set at the tenth graduation of scale 10S or a minimum limit of one-half inch, and maximum limit of 11/20th of an inch. An object occupying the space between the edge of slide 21 and edge of extension 15A would measure .5250 of an inch.

An additional scale 10SS is shown in Figure 3 with vernier 15AS and indicator therefor marked on extension 15A.

This scale and vernier may be used when articles are measured between caliper jaws 18 and 22.

It will be seen from the above description, that my device presents a simple and accurate means for the measurement of objects of various forms coupled with scale graduations indicating the exact measurements thereof.

I do not limit myself to the particular size, shape, number or arrangement of parts as illustrated and described as there are given simply as a means for clearly describing my invention.

What I claim is:—

1. In a measuring device, in combination, a base, a raised straight-edge fixedly attached to the base and having graduations thereon, a second raised straight-edge fixedly attached to the base and positioned angularly to the first mentioned straight-edge, a slide member slidable over the first mentioned straight-edge and having a straight edge parallel to the second straight-edge, said first mentioned straight-edge being provided with indicia indicating the distance between the slide straight-edge and the second mentioned straight-edge.

2. In a measuring device, in combination, a base a raised straight-edge resting upon the base throughout its length, fixedly attached thereto and having graduations thereon; a second raised straight-edge resting upon the base and fixedly attached thereto in angular position to the first mentioned straight-edge; and a slide member slidable over the first mentioned straight-edge and having a straight-edge parallel to the second straight-edge, said first mentioned straight-edge being provided with indicia indicating the distance between the slide straight-edge and the second mentioned straight-edge.

3. In a measuring device, in combination, a base, a raised straight-edge resting upon the base throughout its length, fixedly attached thereto and having graduations thereon; a second raised straight-edge resting upon the base and fixedly attached thereto in angular position to the first mentioned straight-edge; the graduations upon the first mentioned straight-edge indicating the length of a line drawn at right angles to the second straight-edge and passing through said graduations, and a slide member slidable over the first mentioned straight-edge, and having a straight-edge parallel to the second straight-edge, said first mentioned straight-edge being provided with indicia indicating the distance between the slide straight-edge and the second mentioned straight-edge.

Signed at New York city, in the county of New York and State of New York, this 19th day of May, 1926.

WILLIAM FRANCIS BULL.